Dec. 6, 1966  T. H. PAPWORTH  3,289,565
AERATION SYSTEM FOR FREIGHT CAR
Filed Jan. 18, 1965
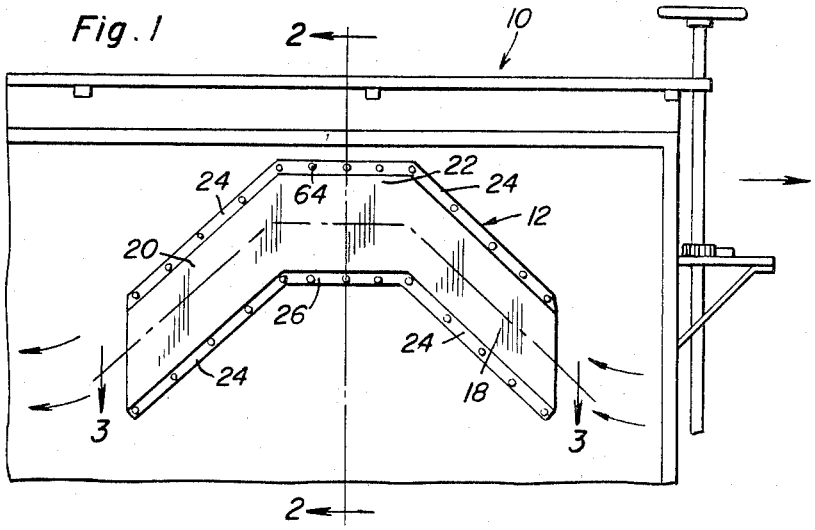
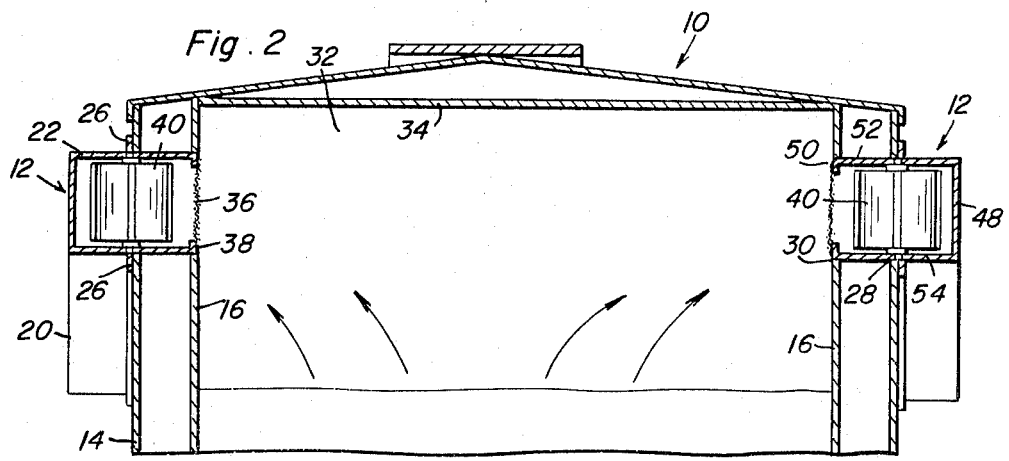
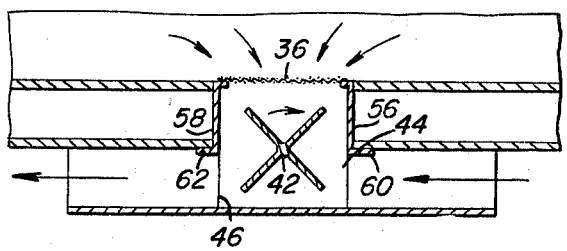
Thomas H. Papworth
INVENTOR.
BY Clarence A. O'Brien
and Harvey B. Jacobson
Attorneys _United States Patent Office_ 3,289,565
Patented Dec. 6, 1966

3,289,565
AERATION SYSTEM FOR FREIGHT CAR
Thomas H. Papworth, 552 Honore Drive,
New Orleans, La.
Filed Jan. 18, 1965, Ser. No. 426,280
5 Claims. (Cl. 98—6)

This invention relates to freight cars for conveying grain and the like, and more particularly to an aeration system for ventilating the freight cars.

It is a primary object of this invention to provide aeration means for freight cars, which convey or store grain, feed, meal, fertilizer, or any bulk commodity therein. It is well known that grain, feed, etc. when stored in bulk are subject to a certain amount of spontaneous heating, and smoldering. In the event that the grain or other bulk materials stored within a freight car has moisture therein such spontaneous heating may result in considerable damage to the material stored, whereby the material stored may be spoiled or permanently damaged.

A second object of this invention is to provide an aeration means, whereby, grain or other material conveyed stored in bulk in a freight car may be aerated so that air moving about in the freight car will prevent such smoldering to occur.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a partial side elevational view of a freight car with the aeration system of this invention incorporated therein;

FIGURE 2 is a cross sectional view of the freight car of FIGURE 1 taken substantially along the line 2—2 of FIGURE 1 and showing an aeration system for the freight car according to this invention installed on each side of the freight car; and FIGURE 3 is a cross sectional view of one side of the freight car with an aeration system according to this invention installed therein taken substantially along the section line 3—3 of FIGURE 1.

Referring now more particularly to the drawings, a freight car 10 has two or more aeration systems 12 installed thereon, with at least one aeration system on each side of the freight car, as is illustrated in FIGURE 2. The freight car 10 has an outer side wall 14 and an inner side wall 16 spaced therefrom. The inner side wall is preferably of a smooth type sealed surface so that bulk material stored therein will not leak outwardly from the freight car.

The aeration system 12 comprises an inlet duct 18, and an outlet duct 20, each connected to a vertilation box 22. The ducts and ventilation box are made from sheet material, such as sheet metal, and have flanges extending from the edges thereof, indicated by reference numerals 24 and 26. The ventilation box has a depth substantially greater than the depth of the ducts 18 and 20, whereby the ventilation box 22 may be inserted through an opening 28 in the side of the railroad var, with approximately one-half of the ventilation box being inside the freight car. The ventilation box is adapted to extend to the inner side walls 16 of the freight car and through an opening 30 provided therein so that the ventilation box extends into the compartment 32 of the freight car below the roof 34 which extends between the side walls 16. The edge of the ventilation box which extends into the side wall 16 is flush therewith and has an opening therein which is covered by a screen 36. The screen 36 is attached to finanges 38 on the ventilation box side. A substantially vertical fan 40 is provided in the central region of the ventilation box 22. The fan 40 has radial blades thereon which are adapted to rotate about a vertical pivot axis 42.

The inlet duct 18 is made from sheet metal, and the sheet metal is bent into U-shaped form providing a side, top, and bottom for the inlet duct. Flanges 24 are bent outwardly from the top and bottom portion of the inlet duct to provide a means whereby the inlet duct may be secured to the side of the wall of the box car. The U-shaped inlet duct is disposed along an oblique plane to the ventilation box so that when the inlet duct is connected to the ventilation box to provide a conduit opening flush into an opening 44 in the ventilation box, the air passing through the inlet box will be coming upwardly therethrough before passing into the ventilation box. The outlet duct 20 is made substantially the same as the inlet duct 18 in that it is generally U-shaped in configuration. The outlet duct is installed flush with an outlet opening 46 provided in the ventilation box, and the outlet duct 20 is disposed oblique to the ventilation box, and is downwardly disposed therefrom so that air passing through the ventilation box and into the outlet duct 20 will flow downwardly from the ventilation box.

The ventilation box 22 of this invention comprises an outer side 48, an inner side 50, a top 52, a bottom 54, a front side 56 and a back side 58. A hole is cut in the inside 50 of the ventilation box communicating with the inside of the compartment 32. The hole provided in the inside of the ventilation box is covered by the screen 36 which is attached to the finanges 38 which are all that remain of the inside when the opening is cut therein. Flanges 60 and 62 are formed on the front side, and back side, 56 and 58, respectively, of the ventilation box by bending a portion of these sides normal to the sides after the openings 44 and 46 have been cut in the sides. The flanges 60 and 62 are adapted to rest flush against the side 14 of the railroad car when the ventilation box is installed thereto and provide supporting means whereby the ventilation box is held rigidly within the opening 28 in the railroad car.

The aeration system of this invention is installed in a railroad car in the following manner. The ventilation box with the fan 40 therein is installed into an opening in the side of a box car provided therefor, and the ventilation box is secured to the side of the car by attaching the flanges 26, 60 and 62 thereon to the side of the box car. The flanges may be attached to the side of the box car by rivets indicated by reference numeral 64, or by bolting the ventilation box to the side of the railroad car, or by welding the flanges thereto depending on the freight car construction. When the ventilation box is so affixed to the side of the freight car, the inside 50 of the ventilation box will lie flush along the plane of the inside 16 of the freight car, with the side opening of the ventilation box identified by the flanges 38 communicating with the compartment 32 of the box car.

The inlet duct 18 is then attached to the side of the box car so that the outlet for air passing therethrough is flush with the opening 44 in the front side of the ventilation box 22. When the inlet duct is so affixed to the side of the box car, the inlet duct will be disposed obliquely to the ventilation box. The outlet duct 20 is connected in a similar manner to the side of the box car with the mouth of the conduit therefor disposed flush against the opening 46 provided in the back side of the ventilation box. The inlet duct and outlet duct are secured to the side of the box car by riveting the ducts thereto along the flanges 24 provided on the ducts. The inlet duct and the outlet duct may also be affixed to the side of the box car by welding or bolting the flanges to the side of the box car.

When the aeration system is so installed on a side of a freight car, aeration will be provided to the compartment 32 inside the box car by air passing through the inlet and outlet duct, and through the ventilation box thereby rotating the fan 40 to create a current of air in the compartment 32 and thereby aerate the compartment and any bulk material which may be stored in the compartment. An air current will be provided in the inlet duct ventilation box and through the outlet duct when the freight car is in motion as is indicated for example by the arrow projecting from the box car in FIGURE 1. The current created in the compartment 32 will displace stagnant air therein and will serve to prevent heating of bulk material, or other material stored in the compartment by such stagnant air. In effect, air forced through the inlet duct by movement of the railroad car will turn the fan 40, which rotation will displace the stale air in the car and draw fresh air through material stored in the compartment 32 in the box car. It is preferred that at least two aeration systems be used on a box car, one aeration system being provided on each side of the box car.

It will be obvious to those skilled in the art to which this invention pertains that this new and novel construction for aerating box cars and the like will keep rain and snow out of the inner compartment to be aerated. When ventilation or aeration of the inner compartment 32 is undesirable, an insulated panel may be placed over the opening defined by the flanges 48 or over the openings 44 and 46 in the front side 56 and 58, respectively of the ventilation box.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A ventilator duct formed of sheet material for ventilating box cars, said duct comprising an inlet duct, a ventilator box and an outlet duct, said inlet duct and outlet duct being U-shaped in cross section with flanges along the ends thereof for securing the inlet duct and outlet duct to the car to be ventilated, said ventilator box having flanges disposed centrally along the top and bottom thereof for securing the ventilator box to the car to be ventilated, said ventilator box having openings in one side and in the front and rear, said inlet duct having a conduit communicating with the front opening of the ventilator box, and said outlet duct having a conduit communicating with the rear opening in the ventilator box, the flanges on the inlet duct, ventilator box and outlet duct all being substantially in the same plane, said ventilator box extending on both sides of said plane whereby the ventilator box is adapted to partially fit into a car to be ventilated through an aperture provided therefor when said flanges are secured to the sides of the car.

2. The ventilator duct of claim 1 wherein said opening in one side of the ventilator box is on the side of the box wherein the opening will be inside the car to be ventilated when the ventilator duct is secured to the sides of the car by said flanges, and wherein a screen means is affixed to the ventilator box to cover the opening on one side thereof.

3. The ventilator duct of claim 2 wherein said ventilator duct has a fan secured thereto and disposed substantially in the center thereof.

4. The ventilator duct of claim 3 wherein the inlet duct and outlet duct are disposed obliquely to the ventilator box.

5. An aeration system for freight cars or the like comprising, a car compartment to be ventilated having an outside wall and an inside wall, a ventilation box extending from the inside face of the inside wall through an opening in said outside wall and being substantially disposed outside of said outside wall, flanges on said ventilation box securing said ventilation box to said outside wall, an opening in the inside wall and an opening on one side of the ventilation box communicating with said opening in the inside wall and with the compartment to be ventilated, a screen on said ventilation box covering said opening therein, said ventilation box having a front opening in the front side thereof and a back opening in the back side thereof, said front and back openings being on the outside of the outside wall, a fan centrally disposed in said ventilation box and being secured to the top and bottom thereof, an inlet duct bent in a U-shaped form having flanges thereon, said flanges being connected to said outside wall, said outside wall in combination with said U-shaped inlet duct forming an inlet conduit for the passage of air therethrough, said inlet duct abutting against the front of said ventilation box with said inlet conduit communicating with the front opening in said ventilation box and said inlet duct being disposed obliquely to said ventilation box, and a U-shaped outlet duct having flanges thereon, said outlet duct being connected to the outside wall by said flanges, said outside wall in combination with said outlet duct forming an outlet conduit for the passage of air therethrough, said outlet duct abutting against the back of said ventilation box with said outlet duct communicating with the back opening in said ventilation box and said outlet duct being disposed obliquely to said ventilation box.

References Cited by the Examiner

UNITED STATES PATENTS

| | | | |
|---|---|---|---|
| 12,541 | 3/1855 | Corbett | 98—21 |
| 471,649 | 3/1892 | Martin | 98—21 |
| 516,058 | 3/1894 | Merrill | 98—21 |
| 893,433 | 7/1908 | Brandt | 98—21 |

MEYER PERLIN, *Primary Examiner.*